US011434026B2

(12) United States Patent
Agathon-Burton et al.

(10) Patent No.: US 11,434,026 B2
(45) Date of Patent: Sep. 6, 2022

(54) SYSTEMS, ASSEMBLIES, AND METHODS FOR SYSTEM FOR MITIGATING ELECTROSTATIC DISCHARGE BETWEEN SPACE VEHICLES (71) Applicant: Northrop Grumman Systems Corporation, Plymouth, MN (US)

(72) Inventors: Christine A. Agathon-Burton, Bethesda, MD (US); Matthew Alan Michel, Oak Hill, VA (US); Dewey Edwin Cochran, Arlington, VA (US); Ronald Lynn Graham, Herndon, VA (US); Gregg A. Herbert, Waterford, VA (US); William A. Llorens, Herndon, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 67 days.

(21) Appl. No.: 17/074,610

(22) Filed: Oct. 19, 2020

(65) Prior Publication Data
US 2021/0031951 A1 Feb. 4, 2021

Related U.S. Application Data (63) Continuation of application No. 15/829,758, filed on Dec. 1, 2017, now Pat. No. 10,850,871.
(Continued)

(51) Int. Cl.
*B64G 1/52* (2006.01)
*B64G 1/64* (2006.01)
(Continued)

(52) U.S. Cl.
CPC ............. *B64G 1/52* (2013.01); *B64G 1/405* (2013.01); *B64G 1/646* (2013.01); *B64G 1/1078* (2013.01)

(58) Field of Classification Search
CPC ........... B64G 1/52; B64G 1/405; B64G 1/646
See application file for complete search history.

(56) References Cited

U.S. PATENT DOCUMENTS 4,654,746 A 3/1987 Lewis, Jr. et al.
7,070,151 B2 * 7/2006 D'Ausilio ............. B64G 1/646
244/171.1
(Continued)

FOREIGN PATENT DOCUMENTS

JP 06340298 12/1994
JP H06340298 A * 12/1994 ............. B64G 1/646
(Continued)

OTHER PUBLICATIONS

Ferrite Rings, Admin, http://nauchebe.net/2012/04/ferritovye-kolca/, Apr. 18, 2012, 2 pages.
(Continued)

*Primary Examiner* — Tye William Abell
(74) *Attorney, Agent, or Firm* — Phillips Winchester (57) ABSTRACT Methods and systems for mitigating or reducing the risk of an electrostatic discharge due to static charge differentials between a first spacecraft and a second spacecraft as the first spacecraft approaches the second spacecraft may be accomplished using a passive electrostatic discharge mitigation device. In some embodiments, mitigation of static potential between the first spacecraft and the second spacecraft may be actively accomplished by an electric propulsion system provided on the first spacecraft. In some embodiments, mitigation may be provided by both actively and passively mitigating static potential between the first spacecraft and the second spacecraft.

20 Claims, 9 Drawing Sheets

Related U.S. Application Data (60) Provisional application No. 62/484,969, filed on Apr. 13, 2017.

(51) Int. Cl.
  *B64G 1/40* (2006.01)
  *B64G 1/10* (2006.01)

(56) References Cited

U.S. PATENT DOCUMENTS

| | | | |
|---|---|---|---|
| 7,216,833 B2 * | 5/2007 | D'Ausilio | B64G 1/1078 244/171.1 |
| 7,216,834 B2 * | 5/2007 | D'Ausilio | B64G 1/422 244/172.5 |
| 7,461,818 B2 | 12/2008 | D'Ausilio et al. | |
| 7,484,690 B2 * | 2/2009 | D'Ausilio | B64G 1/007 244/171.1 |
| 7,575,199 B2 | 8/2009 | D'Ausilio et al. | |
| 7,588,213 B2 | 9/2009 | D'Ausilio et al. | |
| 7,611,096 B2 | 11/2009 | D'Ausilio et al. | |
| 7,611,097 B2 | 11/2009 | D'Ausilio et al. | |
| 7,624,950 B2 | 12/2009 | D'Ausilio et al. | |
| 8,205,838 B2 * | 6/2012 | Moorer, Jr. | B64G 1/1078 244/158.6 |
| 2014/0240887 A1 * | 8/2014 | Canham | H05F 3/06 361/216 |

FOREIGN PATENT DOCUMENTS

| | | | |
|---|---|---|---|
| JP | 07165198 | 6/1995 | |
| JP | H07165198 A * | 6/1995 | ............ B64G 1/646 |
| JP | 08130097 | 5/1996 | |
| JP | H08130097 A * | 5/1996 | ............... B64G 1/54 |
| RU | 2369991 C1 | 10/2009 | |
| RU | 2612474 C1 | 3/2017 | |
| WO | WO2015197785 A1 | 12/2015 | |
| WO | WO2010133802 A1 | 11/2020 | |

OTHER PUBLICATIONS

V.I. Levantovskij. Space flight mechanics in a basic setting M. Science, 1980, pp. 133-136.

International Search Report for International Application No. PCT/US2018/017852, dated May 24, 2018, 5 pages.

Written Opinion of the International Search Authority for International Application No. PCT/US2018/017852, dated May 24, 2018, 7 pages.

* cited by examiner

SYSTEMS, ASSEMBLIES, AND METHODS FOR SYSTEM FOR MITIGATING ELECTROSTATIC DISCHARGE BETWEEN SPACE VEHICLES

CROSS-REFERENCE TO RELATED APPLICATION

This application is a continuation of U.S. patent application Ser. No. 15/829,758, filed Dec. 1, 2017, for "ELECTROSTATIC DISCHARGE MITIGATION FOR A FIRST SPACECRAFT OPERATING IN PROXIMITY TO A SECOND SPACECRAFT," which application claims the benefit under 35 U.S.C. § 119(e) of U.S. Provisional Patent Application Ser. No. 62/484,969, filed Apr. 13, 2017, the disclosure of each of which is hereby incorporated herein in its entirety by this reference.

FIELD

The present disclosure relates systems and methods for addressing the challenges that arise with regard to electrostatic discharge when a first spacecraft is operating in proximity with a second spacecraft, and particularly when the first spacecraft approaches the second spacecraft to dock or otherwise contact the second spacecraft.

BACKGROUND

Thousands of spacecraft orbit the Earth for performing various functions including, for example, telecommunication, GPS navigation, weather forecasting, and mapping. More complex large spacecraft are also in orbit, including the International Space Station, to which nations throughout the world send crew and supplies for scientific investigation and research. However, spacecraft periodically require servicing to extend their functioning life span. Servicing may include, for example, component repair, refueling, orbit raising, station-keeping, momentum balancing, or other maintenance. Without life extension maintenance, these spacecraft may fall out of service, and replacement is generally extraordinarily expensive and can have a lead time of years. In the case of unmanned spacecraft, to accomplish such servicing, a servicing spacecraft may be sent into orbit to dock with a client spacecraft requiring maintenance, and subsequent to docking, perform life-extending maintenance on the client.

However, spacecraft or other bodies in orbit often possess different electrical potentials. When two spacecraft approach each other, a significant risk arises that an electrostatic discharge could occur between the two spacecraft. Spacecraft contain numerous electronic systems that could be damaged or destroyed by such an electrostatic discharge event. Various patents and publications have considered how to mitigate the risk of an electrostatic discharge event, including U.S. Pat. Nos. 7,070,151, 7,216,833, 7,216,834, 7,461,818, 7,484,690, 7,575,199, 7,588,213, 7,611,096, 7,611,097, 7,624,950, and 8,205,838, the disclosure of each of which is hereby incorporated herein in its entirety by this reference. However, an improved system and method for mitigating electrostatic discharge between a first spacecraft and a second spacecraft is desirable.

BRIEF SUMMARY

Methods and systems for mitigating the risk of an electrostatic discharge due to static charge differentials between a first spacecraft and a second spacecraft are disclosed herein. Various embodiments teach a passive electrostatic discharge mitigation device facilitating the safe reduction of static potential between the first and second spacecraft prior to and/or upon contact. Some embodiments provide an apparatus to direct the flow of a static discharge current in a manner that minimizes risk to the electronic components of the first and second spacecraft, which may be accomplished by providing one or more whiskers electrically connected to a passive electrostatic discharge mitigation device. Some embodiments provide for actively mitigating static potential between a first spacecraft and a second spacecraft by means of an electric propulsion system provided on the first spacecraft. Some embodiments provide for both actively and passively mitigating static potential between the first spacecraft and the second spacecraft.

Certain embodiments teach a system and method for mitigating electrostatic discharge between a first space vehicle and a second space vehicle comprising a passive electrostatic discharge mitigation system situated on the first space vehicle, wherein the passive electrostatic discharge mitigation system comprises one or more resistors and wherein the passive electrostatic discharge mitigation system comprises one or more ferrite beads. In some embodiments, the passive electrostatic discharge mitigation system reduces an electrostatic discharge current between the first space vehicle and the second space vehicle to less than or equal to about 800 milliamps over a time period of less than or equal to about 90 nanoseconds. Some embodiments further comprise one or more whiskers as part of the passive electrostatic discharge mitigation system.

Certain embodiments teach a system and method for mitigating electrostatic discharge between a first space vehicle and a second space vehicle comprising an active electrostatic discharge system situated on the first space vehicle, wherein the active electrostatic discharge system manipulates a plasma field. In various embodiments, the manipulated plasma field is the plasma field of the first space vehicle, the plasma field of the second space vehicle, or the plasma fields of both the first and second space vehicles. The active electrostatic discharge system may manipulate the plasma field using an electric propulsion apparatus. Some embodiments provide that the electric propulsion apparatus produce a plasma field significant enough to reduce the potential between the first space vehicle and the second space vehicle to less than about +/−200 volts. The electric propulsion apparatus may be one or more Hall Effect Thrusters.

Certain embodiments teach a system and method for mitigating electrostatic discharge between a first space vehicle and a second space vehicle, comprising a propulsion mechanism for maneuvering the first space vehicle in space; a capture mechanism positioned on the first space vehicle for at least temporarily joining the first space vehicle to the second space vehicle; and a mechanism for passively mitigating electrostatic discharge. The mechanism for passively mitigating electrostatic discharge may include one or more compliant members, which in some embodiments may be one or more whiskers. In some embodiments, the compliant member provides the first physical contact between the first space vehicle and the second space vehicle. The compliant member may contact an engine of the second space vehicle and, in some embodiments, the compliant member always contacts the engine before any other physical structure on the second space vehicle. The engine of the second space vehicle may be a liquid apogee engine. According to some embodiments, the capture mechanism includes a probe. The compliant member may be positioned on the probe. Some embodiments provide that the compliant member extends from the first space vehicle in a direction toward the second space vehicle. The compliant member may be highly compliant. In some embodiments, the compliance of the compliant member is provided in part by a torsion spring. According to some embodiments, the compliant member is comprised of beryllium copper.

Certain embodiments teach a system and method for mitigating electrostatic discharge between a first space vehicle and a second space vehicle comprising a passive electrostatic discharge mitigation system situated on the first space vehicle; and an active electrostatic discharge system situated on the first space vehicle. In some embodiments, the passive electrostatic discharge mitigation system comprises one or more resistors and wherein the passive electrostatic discharge mitigation system comprises one or more ferrite beads. In some embodiments, the active electrostatic discharge system manipulates a plasma field. The passive electrostatic discharge mitigation system may reduce an electrostatic discharge current between the first space vehicle and the second space vehicle to less than or equal to about 800 milliamps over a time period of less than or equal to about 90 nanoseconds. The system further may include a whisker or a plurality of whiskers. The whisker may provide the first physical contact between the first space vehicle and the second space vehicle, and may contact an engine of the second space vehicle. The whisker may extend from the first space vehicle in a direction toward the second space vehicle. In some embodiments, the whisker always contacts the engine before any other physical structure on the second space vehicle. The capture mechanism may include a probe, and the whisker may be positioned on the probe in some embodiments. The whisker may be highly compliant and, in some embodiments, the compliance is provided in part by a torsion spring. In some embodiments, the whisker is comprised of beryllium copper. In some embodiments, the manipulated plasma field is the plasma field of the first space vehicle, the plasma field of the second space vehicle, or the plasma fields of both the first and second space vehicles. The active electrostatic discharge system may manipulate the plasma field using an electric propulsion apparatus, which may be one or more Hall Effect Thrusters in some embodiments. The electric propulsion apparatus may produce a plasma field significant enough to reduce the potential between the first space vehicle and the second space vehicle to less than about +1-200 volts.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Although embodiments of the disclosure disclosed herein are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure.

DETAILED DESCRIPTION

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

The inventors have recognized the risk of damage from electrostatic discharges due to static charge differentials associated with an approach of a first spacecraft to a second spacecraft. In some embodiments, the first spacecraft may comprise a capture assembly that beneficially provides electrostatic mitigation to protect electronic components in the first spacecraft, the second spacecraft, or both. Some embodiments provide systems and methods for reducing the static potential between a first and second spacecraft in a manner that protects the components of both spacecraft.

Figure 1:
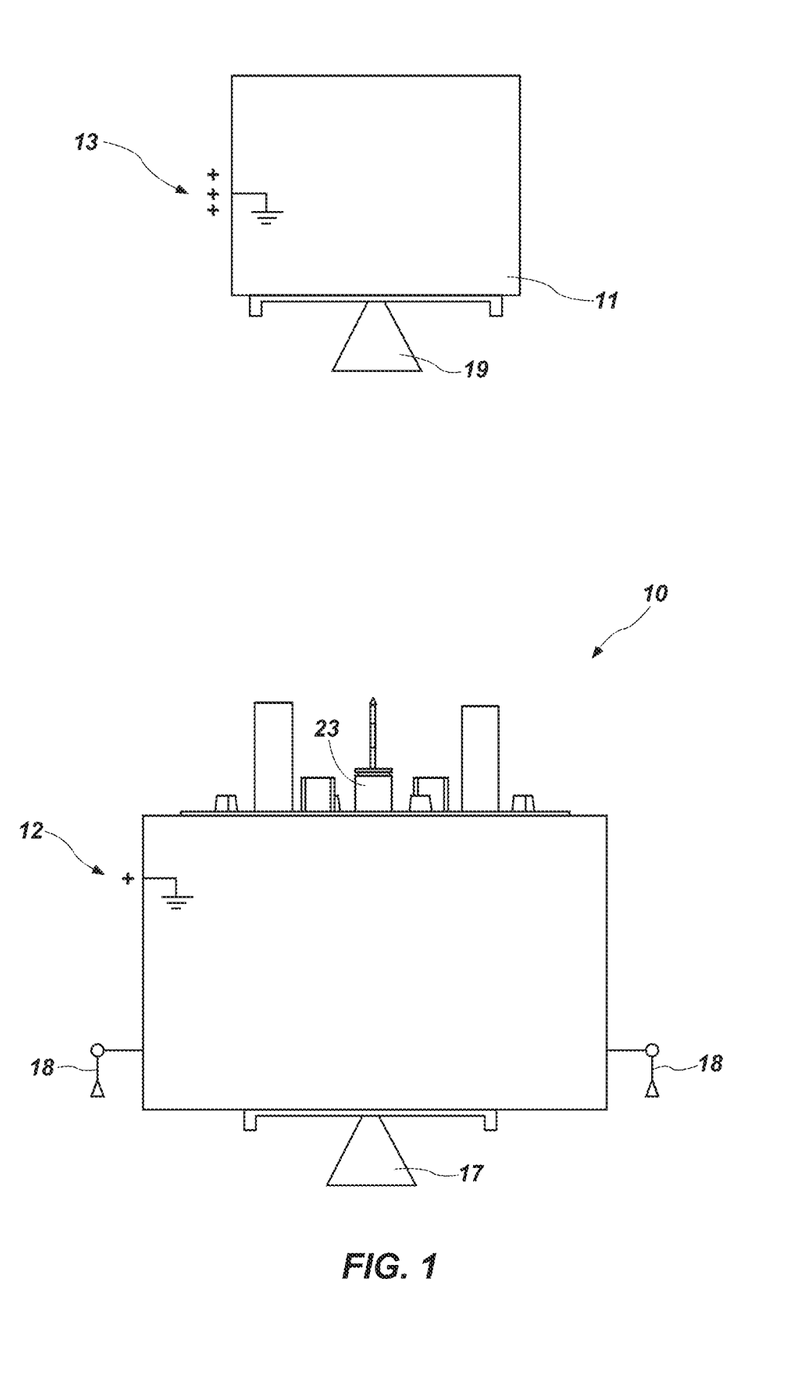
FIG. 1 is a side elevational view of a first spacecraft and a second spacecraft in proximity, according to one or more embodiments.

FIG. 1 is a side elevation view of two spacecraft in proximity in space according to one embodiment. In some embodiments, first spacecraft 10 may be designed to dock to second spacecraft 11. First spacecraft 10 may be a servicer spacecraft designed to provide service to second spacecraft 11. According to some embodiments, second spacecraft 11 may be a satellite in orbit around a body such as the Earth. If second spacecraft 11 is in orbit around Earth, second spacecraft 11 may be in low or medium Earth orbit, geosynchronous or above-geosynchronous orbit, or any other orbit.

First spacecraft 10 may have a capture apparatus 23 with a probe and a propulsion system. The propulsion system of first spacecraft 10 may include one or more main thrusters 17, one or more gimbaled thrusters 18, or both. Main thruster 17, gimbaled thrusters 18, or both may be electric propulsion apparatuses. Second spacecraft 11 may have an engine 19. Engine 19 can be any type of suitable engine or motor for a spacecraft, including a liquid apogee engine or a solid fuel motor. First spacecraft 10 may have a first static potential 12, and second spacecraft 11 may have a second static potential 13. Upon approach or contact of first spacecraft 10 to second spacecraft 11, a differential between first static potential 12 and second static potential 13 may cause an electrostatic discharge. Such an electrostatic discharge may cause damage to first spacecraft 10, second spacecraft 11, or both, unless the differential between first static potential 12 and second static potential 13 is mitigated.

Figure 2:
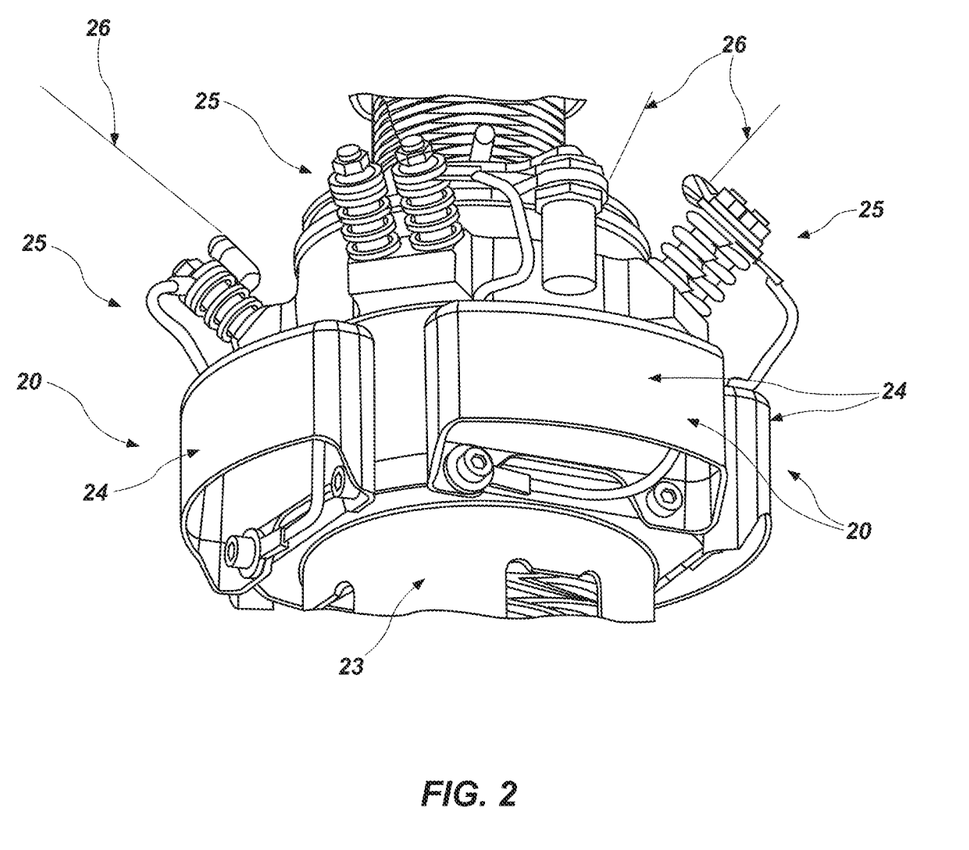
FIG. 2 is a perspective diagram of a passive electrostatic discharge mitigation system, according to one or more embodiments.
Figure 3:
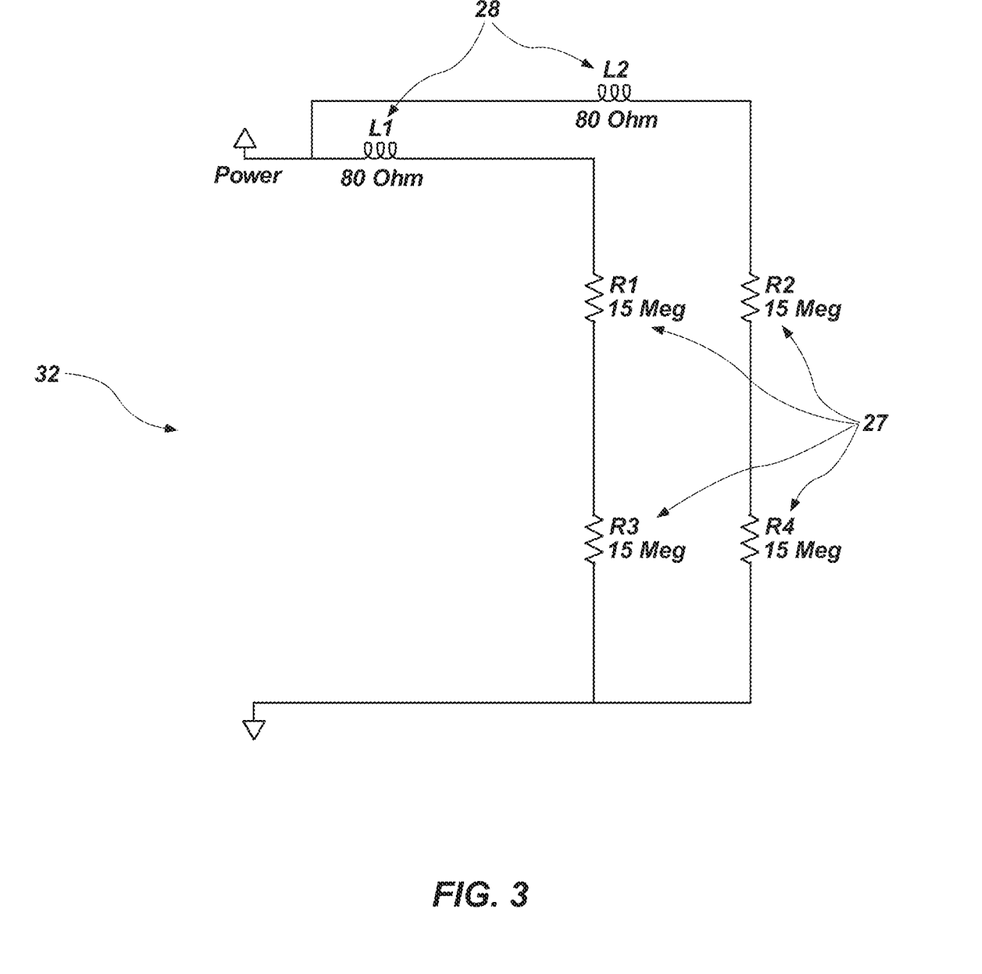
FIG. 3 is a diagram of a circuit of a passive electrostatic discharge mitigation system, according to one or more embodiments.

FIG. 2 is a perspective diagram of a passive electrostatic discharge mitigation system 20 according to one embodiment. A circuit 32, as shown in FIG. 3, of passive electrostatic discharge mitigation system 20 may be housed within a housing or box 24. Passive electrostatic discharge system 20 may be electrically connected to capture apparatus 23 or another portion of first spacecraft 10. Passive electrostatic discharge system 20 may also be electrically connected to a first electrical contact apparatus 25. First electrical contact apparatus 25 may include one or more compliant members (e.g., whiskers 26). Whiskers 26 comprise an electrically conductive material. Whiskers 26 may be comprised at least in part of beryllium copper.

FIG. 3 is a diagram of a circuit 32 of a passive electrostatic discharge mitigation system 20 according to one embodiment. Passive electrostatic discharge mitigation system 20 may be configured as a resistance inductance, or RL, circuit comprising one or more resistive elements 27 and one or more inductive elements 28. In some embodiments, the one or more inductive elements 28 may be an inductor, or one or more ferrite beads, one or more chokes, or another inductive element. The one or more resistive elements 27 may be one or more resistors and, in some embodiments, may be configured to provide a resistance of more than 1 megaohm and, in some embodiments, may be configured to provide a resistance of greater than or equal to 15 megaohms. When first spacecraft 10 and second spacecraft 11 make contact or come in close enough proximity for a static electric arc to occur between the first spacecraft 10 and second spacecraft 11, the passive electrostatic discharge mitigation system 20 provides an equalization path for the voltage differential between the two spacecraft and allows the different static charges to equalize.

As a result of the passive electrostatic discharge mitigation system 20, static voltage differential between the two spacecraft 10, 11 may be converted into heat to remove energy. This dissipation will reduce, or in some instances eliminate, electrostatic discharges and the amplitude and rise time of any associated voltage spikes that may be detrimental to either spacecraft. In some embodiments, the voltage differential may be discharged over a period of time, for example 50-90 nanoseconds or more. In some embodiments, discharge current may be reduced below 800 milliamps by passive electrostatic discharge mitigation system 20. According to certain embodiments, the one or more inductive elements 28 and one or more resistive elements 27 may be selected to accommodate a transient static potential difference between first spacecraft 10 and second spacecraft 11 of up to or more than 10 kilovolts. In some embodiments, the passive electrostatic discharge mitigation system 20 may be configured to have parallel circuit paths that may mitigate the risk of individual component failures.

Figure 4:
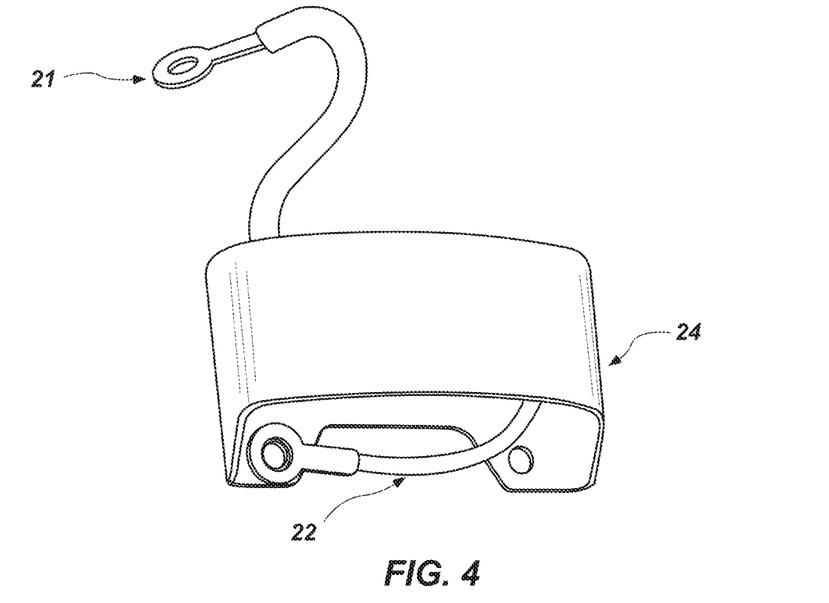
FIG. 4 is a perspective view of a housing for a passive electrostatic discharge mitigation system, according to one or more embodiments.

FIG. 4 is a perspective view of a housing 24 for a passive electrostatic discharge mitigation system 20 (FIG. 2). Insulated conductor 21 provides electrical connection between the passive electrostatic discharge mitigation system 20 and at least one first electrical contact apparatus 25 (FIG. 2), wherein first electrical contact apparatus 25 may comprise a compliant member which may be in the form of whisker 26 (FIG. 2). Insulated grounding conductor 22 provides electrical connection between the passive electrostatic discharge mitigation system 20 and capture apparatus 23 (FIG. 2) or elsewhere on a body of first spacecraft 10 (FIG. 1).

Figure 5:
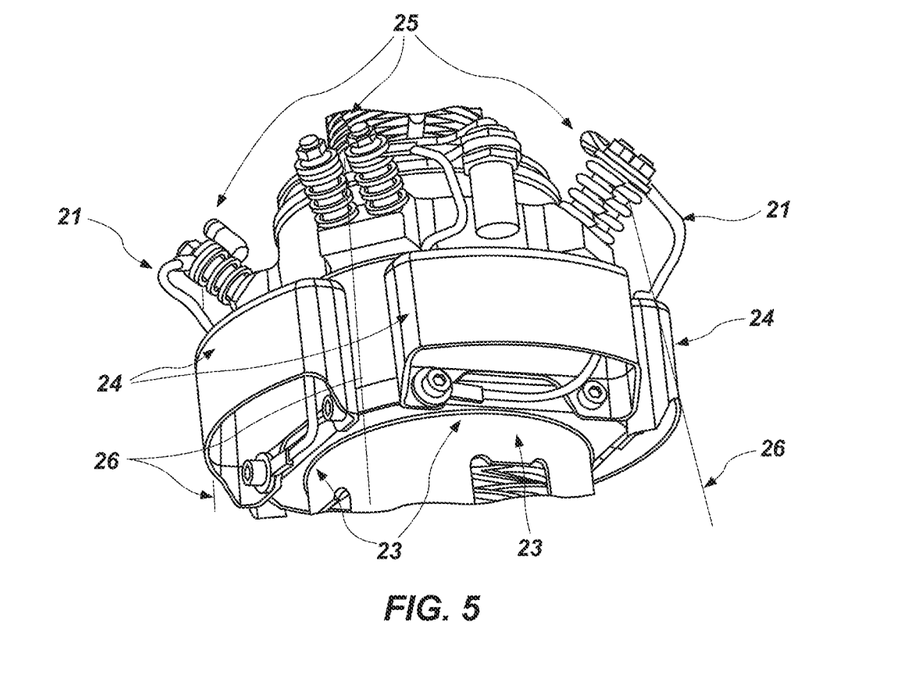
FIG. 5 is a perspective view of a housing for a passive electrostatic discharge mitigation system mounted on a capture apparatus, according to one or more embodiments.

FIG. 5 is a perspective view of a housing 24 for a passive electrostatic discharge mitigation system 20 (FIG. 2) mounted to capture apparatus 23. Insulated conductor 21 provides electrical connection between the passive electrostatic discharge mitigation system 20 and at least one first electrical contact apparatus 25, wherein first electrical contact apparatus 25 may comprise a compliant member such as whisker 26.

Figure 6:
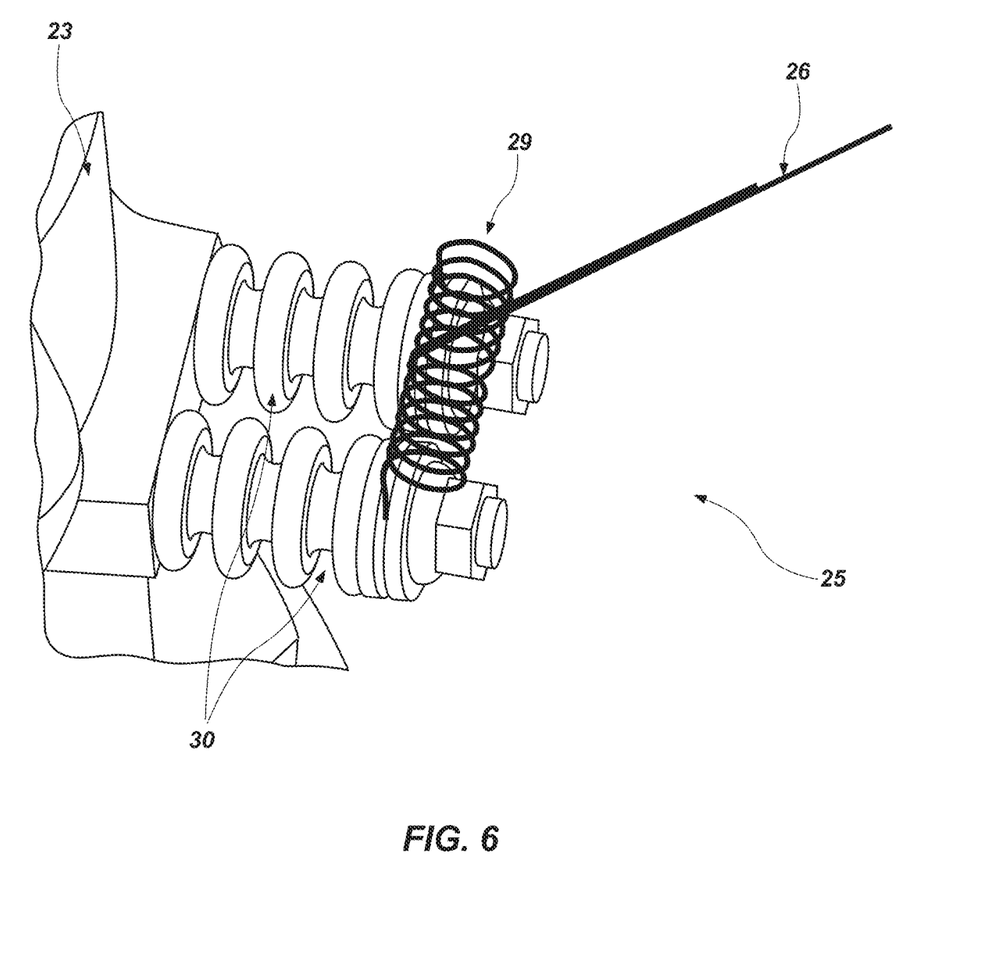
FIG. 6 is a perspective view of a first electrical contact apparatus, according to one or more embodiments.

FIG. 6 is a perspective view of first electrical contact apparatus 25. First electrical contact apparatus 25 may include one or more compliant members such as whiskers 26. Whiskers 26 may comprise a spring element 29 that may increase compliance of whiskers 26. Spring element 29 may be a torsion spring. Spring element 29 may allow whiskers 26 to move in a substantially rotational manner when whiskers 26 contact engine 19 (FIG. 1) or another physical structure on the second spacecraft 11 (FIG. 1). First electrical contact apparatus 25 may be designed to be electrically isolated from capture apparatus 23, for example, by one or more insulated posts 30 that electrically isolate the conductive components, such as the whiskers 26, from the capture apparatus 23. Insulated posts 30 may be comprised of a machinable glass ceramic or other insulating material sufficient to electrically isolate the conductive components. In some embodiments, the conductive components of first electrical contact apparatus 25 may be positioned 0.25 inch or more from the closest conductive component of capture apparatus 23, or another suitable distance to prevent charge creep or arcing.

Figure 7:
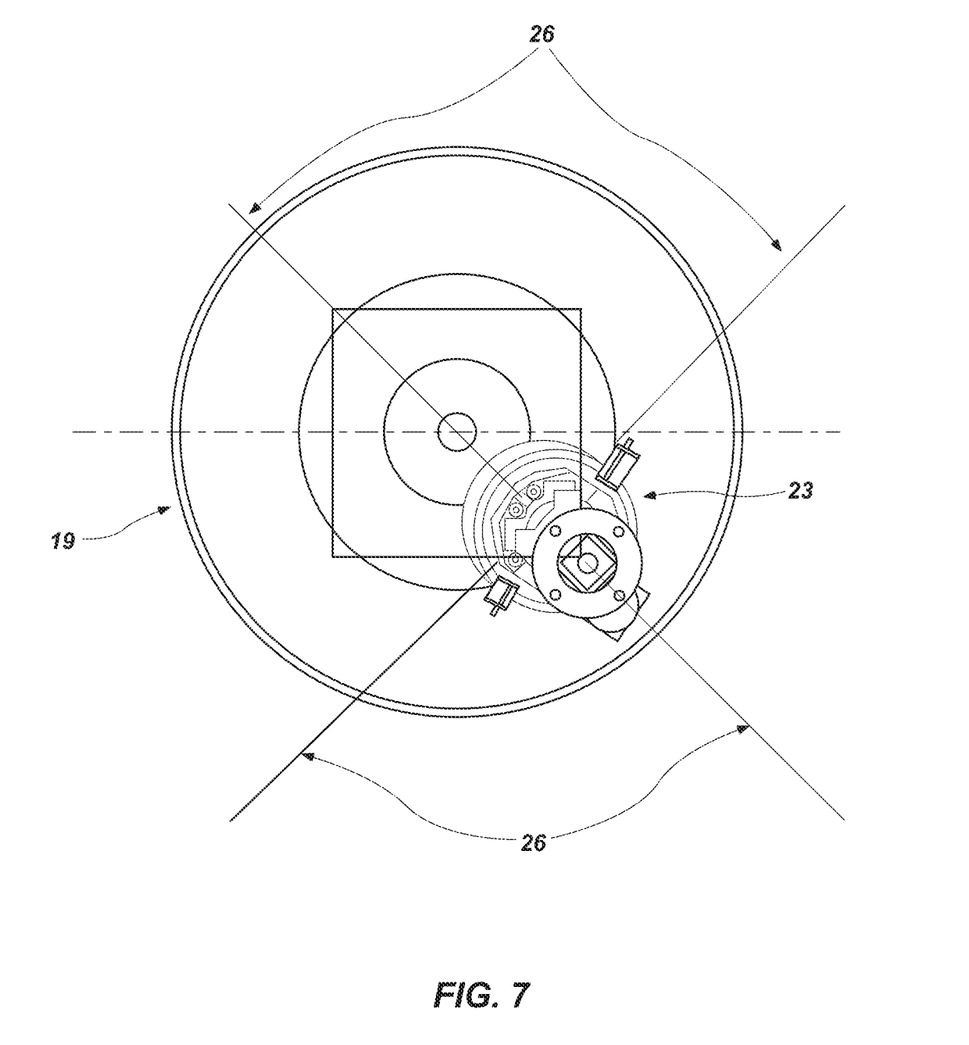
FIG. 7 is a perspective view of a capture apparatus with a passive electrostatic discharge mitigation system mounted thereon approaching an engine of a second spacecraft, according to one or more embodiments.

FIG. 7 is a perspective view of a capture apparatus 23 with a passive electrostatic discharge mitigation system 20 mounted thereon approaching the engine 19 of the second spacecraft 11. Whiskers 26 may be designed to be of a sufficient length to ensure that at least one whisker 26 provides the first point of physical contact between first spacecraft 10 and second spacecraft 11. Whiskers 26 may be designed to be of a sufficient length to ensure that at least one whisker 26 is the only physical structure on the first spacecraft 10 to come within a distance that would allow a static electric arc between first spacecraft 10 and second spacecraft 11 before any portion of first spacecraft 10 physically contacts second spacecraft 11. In some embodiments, whiskers 26 may be at least 6 inches in length.

Figure 8:
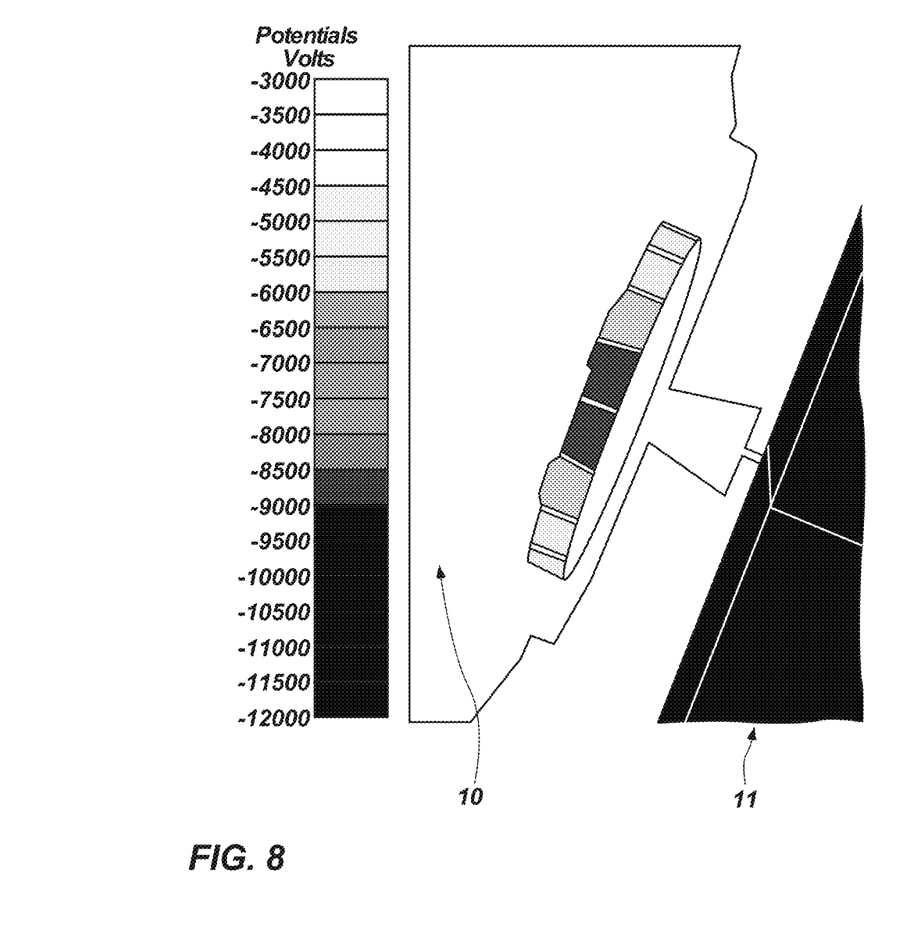
FIG. 8 is a graphical representation of a sample anticipated static potential difference between portions of a first spacecraft and a second spacecraft, according to one or more embodiments.

FIG. 8 depicts charge potential differentials of a first spacecraft in relation to a second spacecraft for use with an active electrostatic discharge mitigation system, according to one embodiment. FIG. 8 graphically represents sample anticipated static potential, or charge, differences between various portions of first spacecraft 10 and second spacecraft 11. In some embodiments, static potential differences may be on the order of 10 kilovolts or more and capacitance between the vehicles may be on the order of 100 picofarads or more.

Figure 9A:
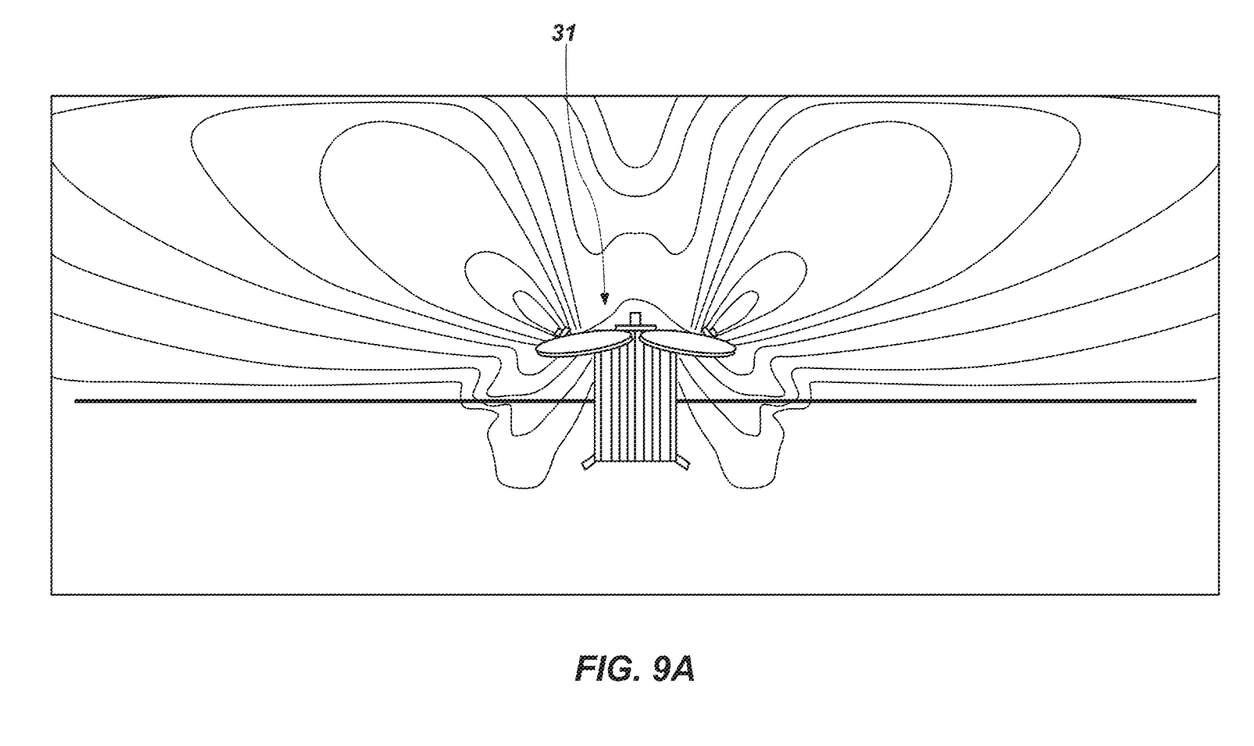
FIGS. 9A and 9B are graphical representations of the operation of an active electrostatic discharge mitigation system to create plasma, according to one or more embodiments.
Figure 9B:
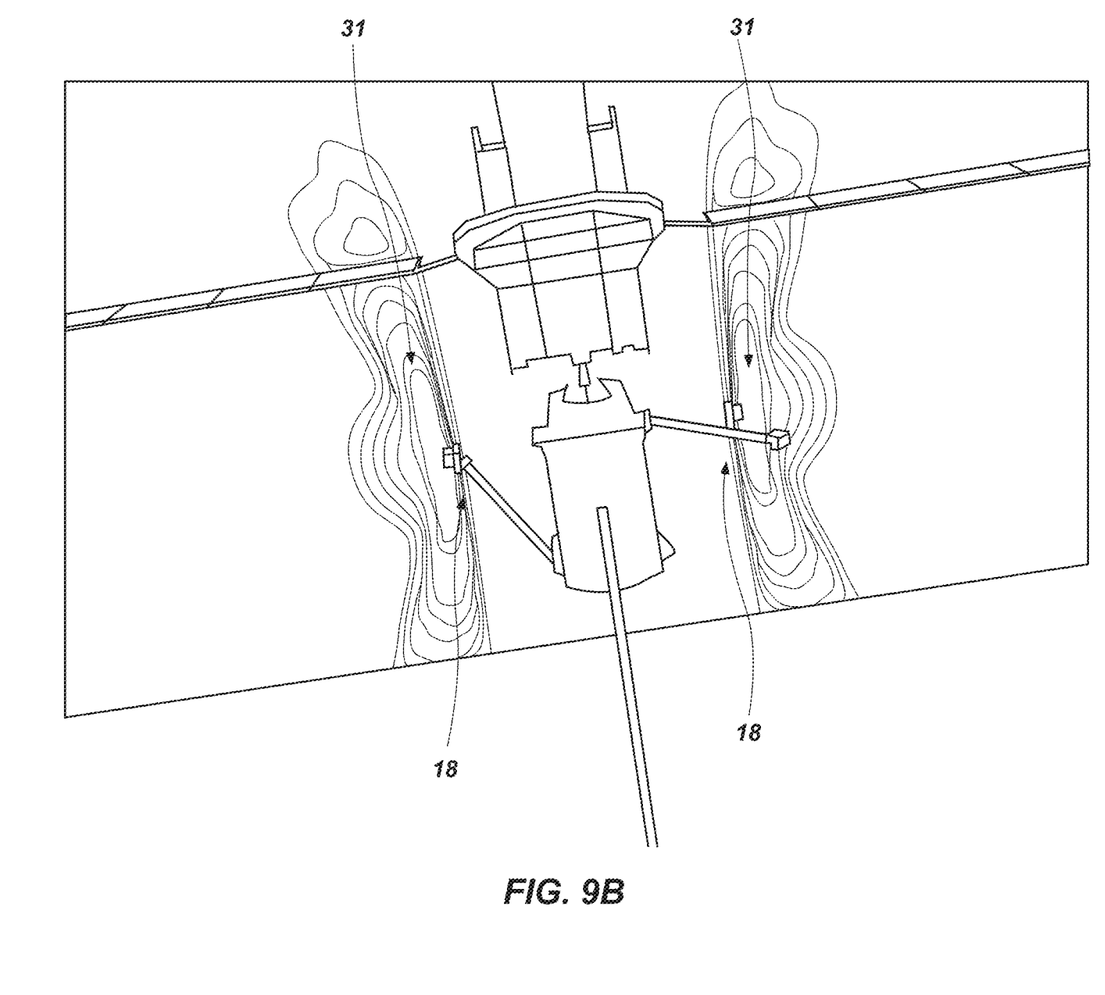

FIGS. 9A and 9B depict an active electrostatic discharge mitigation system 31 using plasma. In some embodiments, the active electrostatic discharge mitigation system 31 may create a plasma field that can engulf both the first spacecraft 10 and the second spacecraft 11. In some embodiments, the active electrostatic discharge mitigation system 31 creates the plasma field using one or more electric propulsion engines of first spacecraft 10, which may be main thruster 17, one or more gimbaled thrusters 18, both, or another engine. The one or more electric propulsion engines may be Hall Effect Thrusters. The plasma field created by the active electrostatic discharge mitigation system 31 may be low temperature plasma. Active electrostatic discharge mitigation system 31 can be operated to reduce the static potential measured to ground reference of each of first spacecraft 10 and second spacecraft 11. The reduction of static potential differential between first spacecraft 10 and second spacecraft 11 may be to a level less than about 5 kilovolts, less than about 1 kilovolt, less than about 200 volts, or less than about 100 volts in various embodiments. In addition, use of the active electrostatic discharge mitigation system 31 may reduce potential ground bounce between the first spacecraft 10 and second spacecraft 11.

In some embodiments, the first spacecraft 10 may have both a passive electrostatic discharge mitigation system 20 and an active electrostatic discharge mitigation system 31. In such embodiments, active electrostatic discharge mitigation system 31 may reduce differential static potential between first spacecraft 10 and second spacecraft 11 before contact, and passive electrostatic discharge mitigation system 20 to mitigate remaining differential static potential between first spacecraft 10 and second spacecraft 11 upon contact or approach sufficient to permit electrostatic arcing. In such embodiments, passive electrostatic discharge mitigation system 20 and active electrostatic discharge mitigation system 31 provide redundancy upon component failure of either system.

Further example embodiments are disclosed below.

Embodiment 1: A system for mitigating electrostatic discharge between a first space vehicle and a second space vehicle comprising a passive electrostatic discharge mitigation system situated on the first space vehicle, wherein the passive electrostatic discharge mitigation system comprises one or more resistors.

Embodiment 2: The system of Embodiment 1, wherein the passive electrostatic discharge mitigation system reduces an electrostatic discharge current between the first space vehicle and the second space vehicle to less than or equal to about 800 milliamps over a time period of less than or equal to about 90 nanoseconds.

Embodiment 3: The system of Embodiment 1, wherein the passive electrostatic discharge mitigation system further comprises one or more inductive elements selected from the group comprising inductors, ferrite beads, and chokes.

Embodiment 4: The system of Embodiment 1, wherein the system further includes one or more whiskers.

Embodiment 5: A system for mitigating electrostatic discharge between a first space vehicle and a second space vehicle comprising an active electrostatic discharge system situated on the first space vehicle, wherein the active electrostatic discharge system manipulates a plasma field.

Embodiment 6: The system of Embodiment 5, wherein the plasma field is the plasma field of the first space vehicle.

Embodiment 7: The system of Embodiment 5, wherein the plasma field is the plasma field of the second space vehicle.

Embodiment 8: The system of Embodiment 5, wherein the active electrostatic discharge system manipulates the plasma field using an electric propulsion apparatus.

Embodiment 9: The system of Embodiment 8, wherein the electric propulsion apparatus produces a plasma field significant enough to reduce the potential between the first space vehicle and the second space vehicle to less than about +1-200 volts.

Embodiment 10: The system of Embodiment 8, wherein the electric propulsion apparatus is one or more Hall Effect Thrusters.

Embodiment 11: A system for mitigating electrostatic discharge between a first space vehicle and a second space vehicle, comprising: a propulsion mechanism for maneuvering the first space vehicle in space; a capture mechanism positioned on the first space vehicle for at least temporarily joining the first space vehicle to the second space vehicle; and a mechanism for passively mitigating electrostatic discharge.

Embodiment 12: The system of Embodiment 11, wherein the mechanism for passively mitigating electrostatic discharge includes one or more whiskers.

Embodiment 13: The system of Embodiment 12, wherein the whisker provides the first physical contact between the first space vehicle and the second space vehicle.

Embodiment 14: The system of Embodiment 13, wherein the whisker contacts an engine of the second space vehicle.

Embodiment 15: The system of Embodiment 14, wherein the whisker always contacts the engine before any other physical structure on the second space vehicle.

Embodiment 16: The system of Embodiment 15, wherein the engine is a liquid apogee engine.

Embodiment 17: The system of Embodiment 12, wherein the capture mechanism includes a probe.

Embodiment 18: The system of Embodiment 17, wherein the whisker is positioned on the probe.

Embodiment 19: The system of Embodiment 13, wherein there are a plurality of whiskers.

Embodiment 20: The system of Embodiment 13, wherein the whisker extends from the first space vehicle in a direction toward the second space vehicle.

Embodiment 21: The system of Embodiment 13, wherein the whisker is highly compliant.

Embodiment 22: The system of Embodiment 21, wherein the compliance is provided in part by a torsion spring.

Embodiment 23: The system of Embodiment 13, wherein the whisker is comprised of beryllium copper.

Embodiment 24: A method for mitigating electrostatic discharge between a first space vehicle and a second space vehicle comprising: providing a passive electrostatic discharge mitigation system on the first space vehicle, wherein the passive electrostatic discharge mitigation system comprises one or more resistors; and configuring the first contact between the first space vehicle and the second space vehicle to ensure that any electrostatic discharge between the first space vehicle and the second space vehicle is directed through the passive electrostatic discharge mitigation system.

Embodiment 25: The method of Embodiment 24, wherein the method further comprises reducing an electrostatic discharge current between the first space vehicle and the second space vehicle to less than or equal to about 800 milliamps over a time period of less than or equal to about 90 nanoseconds using the passive electrostatic discharge mitigation system.

Embodiment 26: The method of Embodiment 24, wherein the passive electrostatic discharge mitigation system further comprises one or more inductive elements selected from the group comprising inductors, ferrite beads, and chokes.

Embodiment 27: The method of Embodiment 24, wherein the passive electrostatic discharge mitigation system further includes one or more whiskers.

Embodiment 28: A method for mitigating electrostatic discharge between a first space vehicle and a second space vehicle comprising: providing an active electrostatic discharge system situated on the first space vehicle; and manipulating a plasma field using the active electrostatic discharge system.

Embodiment 29: The method of Embodiment 28, wherein the manipulating of the plasma field comprises manipulating the plasma field of the first space vehicle.

Embodiment 30: The method of Embodiment 28, wherein the manipulating of the plasma field comprises manipulating the plasma field of the second space vehicle.

Embodiment 31: The method of Embodiment 28, wherein the manipulating of the plasma field comprises manipulating the plasma field using an electric propulsion apparatus.

Embodiment 32: The method of Embodiment 31, wherein the method further comprises producing a plasma field significant enough to reduce the potential between the first space vehicle and the second space vehicle to less than about +/−200 volts using the electric propulsion apparatus.

Embodiment 33: The method of Embodiment 31, wherein the electric propulsion apparatus is one or more Hall Effect Thrusters.

Embodiment 34: A method for mitigating electrostatic discharge between a first space vehicle and a second space vehicle, comprising: providing a capture mechanism positioned on the first space vehicle for at least temporarily joining the first space vehicle to the second space vehicle; maneuvering the first space vehicle in space in proximity to the second space vehicle; and providing a mechanism for passively mitigating electrostatic discharge between the first space vehicle and the second space vehicle.

Embodiment 35: The method of Embodiment 34, wherein the mechanism for passively mitigating electrostatic discharge includes a whisker.

Embodiment 36: The method of Embodiment 35, wherein the method further includes physically contacting the first space vehicle and the second space vehicle, wherein the whisker provides the first physical contact between the first space vehicle and the second space vehicle.

Embodiment 37: The method of Embodiment 36, wherein the whisker contacts an engine of the second space vehicle.

Embodiment 38: The method of Embodiment 37, wherein the whisker always contacts the engine before any other physical structure on the second space vehicle.

Embodiment 39: The method of Embodiment 38, wherein the engine is a liquid apogee engine.

Embodiment 40: The method of Embodiment 35, wherein the capture mechanism includes a probe.

Embodiment 41: The method of Embodiment 40, wherein the whisker is positioned on the probe.

Embodiment 42: The method of Embodiment 36, wherein there are a plurality of whiskers.

Embodiment 43: The method of Embodiment 36, wherein the whisker extends from the first space vehicle in a direction toward the second space vehicle.

Embodiment 44: The method of Embodiment 36, wherein the whisker is highly compliant.

Embodiment 45: The method of Embodiment 44, wherein the compliance is provided in part by a torsion spring.

Embodiment 46: The method of Embodiment 36, wherein the whisker is comprised of beryllium copper.

Embodiment 47: A system for mitigating electrostatic discharge between a first space vehicle and a second space vehicle comprising: a passive electrostatic discharge mitigation system situated on the first space vehicle, wherein the passive electrostatic discharge mitigation system comprises one or more resistors; and an active electrostatic discharge system situated on the first space vehicle, wherein the active electrostatic discharge system manipulates a plasma field.

Embodiment 48: The system of Embodiment 47, wherein the passive electrostatic discharge mitigation system reduces an electrostatic discharge current between the first space vehicle and the second space vehicle to less than or equal to about 800 milliamps over a time period of less than or equal to about 90 nanoseconds.

Embodiment 49: The system of Embodiment 47, wherein the passive electrostatic discharge mitigation system further comprises one or more inductive elements selected from the group comprising inductors, ferrite beads, and chokes.

Embodiment 50: The system of Embodiment 47, wherein the system further includes one or more whiskers.

Embodiment 51: The system of Embodiment 47, wherein the plasma field is the plasma field of the first space vehicle.

Embodiment 52: The system of Embodiment 47, wherein the plasma field is the plasma field of the second space vehicle.

Embodiment 53: The system of Embodiment 47, wherein the active electrostatic discharge system manipulates the plasma field using an electric propulsion apparatus.

Embodiment 54: The system of Embodiment 53, wherein the electric propulsion apparatus produces a plasma field significant enough to reduce the potential between the first space vehicle and the second space vehicle to less than about +1-200 volts.

Embodiment 55: The system of Embodiment 53, wherein the electric propulsion apparatus is one or more Hall Effect Thrusters.

Embodiment 56: The system of Embodiment 49, wherein the whisker provides the first physical contact between the first space vehicle and the second space vehicle.

Embodiment 57: The system of Embodiment 56, wherein the whisker contacts an engine of the second space vehicle.

Embodiment 58: The system of Embodiment 57, wherein the whisker always contacts the engine before any other physical structure on the second space vehicle.

Embodiment 59: The system of Embodiment 49, wherein a capture mechanism includes a probe.

Embodiment 60: The system of Embodiment 59, wherein the whisker is positioned on the probe.

Embodiment 61: The system of Embodiment 60, wherein there are a plurality of whiskers.

Embodiment 62: The system of Embodiment 60, wherein the whisker extends from the first space vehicle in a direction toward the second space vehicle.

Embodiment 63: The system of Embodiment 60, wherein the whisker is highly compliant.

Embodiment 64: The system of Embodiment 63, wherein the compliance is provided in part by a torsion spring.

Embodiment 65: The system of Embodiment 60, wherein the whisker is comprised of beryllium copper.

Embodiment 66: A method for mitigating electrostatic discharge between a first space vehicle and a second space vehicle comprising: providing an active electrostatic discharge system situated on the first space vehicle; manipulating a plasma field using the active electrostatic discharge system; providing a passive electrostatic discharge mitigation system on the first space vehicle, wherein the passive electrostatic discharge mitigation system comprises one or more resistors; and configuring the first contact between the first space vehicle and the second space vehicle to ensure that any electrostatic discharge between the first space vehicle and the second space vehicle is directed through the passive electrostatic discharge mitigation system.

Embodiment 67: The method of Embodiment 66, wherein the method further comprises reducing an electrostatic discharge current between the first space vehicle and the second space vehicle to less than or equal to about 800 milliamps over a time period of less than or equal to about 90 nanoseconds using the passive electrostatic discharge mitigation system.

Embodiment 68: The method of Embodiment 66, wherein the passive electrostatic discharge mitigation system further comprises one or more inductive elements selected from the group comprising inductors, ferrite beads, and chokes.

Embodiment 69: The method of Embodiment 66, wherein the passive electrostatic discharge mitigation system further includes one or more whiskers.

Embodiment 70: The method of Embodiment 66, wherein the manipulating of the plasma field comprises manipulating the plasma field of the first space vehicle.

Embodiment 71: The method of Embodiment 66, wherein the manipulating of the plasma field comprises manipulating the plasma field of the second space vehicle.

Embodiment 72: The method of Embodiment 66, wherein the manipulating of the plasma field comprises manipulating the plasma field using an electric propulsion apparatus.

Embodiment 73: The method of Embodiment 72, wherein the method further comprises producing a plasma field significant enough to reduce the potential between the first space vehicle and the second space vehicle to less than about +/−200 volts using the electric propulsion apparatus.

Embodiment 74: The method of Embodiment 72, wherein the electric propulsion apparatus is one or more Hall Effect Thrusters.

Embodiment 75: The method of Embodiment 69, wherein the method further includes physically contacting the first space vehicle and the second space vehicle, wherein the whisker provides the first physical contact between the first space vehicle and the second space vehicle.

Embodiment 76: The method of Embodiment 75, wherein the whisker contacts an engine of the second space vehicle.

Embodiment 77: The method of Embodiment 76, wherein the whisker always contacts the engine before any other physical structure on the second space vehicle.

Embodiment 78: The method of Embodiment 76, wherein the engine is a liquid apogee engine.

Embodiment 79: The method of Embodiment 68, wherein a capture mechanism includes a probe.

Embodiment 80: The method of Embodiment 79, wherein the whisker is positioned on the probe.

Embodiment 81: The method of Embodiment 80, wherein the whisker extends from the first space vehicle in a direction toward the second space vehicle.

Embodiment 82: The method of Embodiment 69, wherein the whisker is highly compliant.

Embodiment 83: The method of Embodiment 82, wherein the compliance is provided in part by a torsion spring.

Embodiment 84: The method of Embodiment 69, wherein the whisker is comprised of beryllium copper.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for mitigating electrostatic discharge between space vehicles, the system comprising:
    an electrostatic discharge assembly comprising:
        one or more conductive contact elements to be coupled to only one of the space vehicles proximate a capture mechanism positioned on the one of the space vehicles, the capture mechanism to at least temporarily join the space vehicles, the one or more conductive contact elements to provide initial physical contact between the electrostatic discharge assembly of the one of the space vehicles and a body of another space vehicle of the space vehicles; and
        one or more equalization elements electrically connected to the one or more conductive contact elements, the one or more equalization elements to mitigate the electrostatic discharge between the space vehicles during a joining procedure between the space vehicles with the capture mechanism.

2. The system of claim 1, further comprising another electrostatic discharge system situated on one of the space vehicles, wherein the another electrostatic discharge system is configured to use an electric propulsion apparatus on the one of the space vehicles to reduce an electric potential between the space vehicles by engulfing one or both of the space vehicles with a plasma field.

3. The system of claim 1, wherein the one or more conductive contact elements are electrically isolated from the capture mechanism.

4. The system of claim 3, further comprising one or more insulated posts for electrically isolating the one or more conductive contact elements from the capture mechanism.

5. The system of claim 1, wherein the one or more conductive contact elements are in direct electrical communication with the one or more equalization elements.

6. The system of claim 5, wherein the one or more equalization elements comprise a resistance inductance circuit.

7. The system of claim 1, wherein one or more conductive contact elements comprise one or more whiskers having a proximal end coupled to the one of the space vehicles and a distal end configured to provide the initial physical contact between the space vehicles.

8. The system of claim 7, wherein the one or more whiskers comprise a spring element for enabling movement of the one or more whiskers.

9. An electrostatic discharge assembly for mitigating electrostatic discharge between space vehicles, the assembly comprising:
    one or more conductive contact elements configured to be coupled to one of the space vehicles proximate a capture mechanism positioned on the one of the space vehicles for at least temporarily joining the space vehicles, the one or more conductive contact elements to provide physical contact between the electrostatic discharge assembly of the one of the space vehicles and a body of another space vehicle of the space vehicles; and one or more equalization elements electrically connected to the one or more conductive contact elements, the one or more equalization elements to mitigate the electrostatic discharge between the space vehicles during a joining procedure between the space vehicles using the capture mechanism, wherein the one or more conductive contact elements are electrically isolated from the capture mechanism.

10. The assembly of claim 9, wherein the one or more conductive contact elements are electrically isolated from the capture mechanism with one or more insulated posts on which the one or more conductive contact elements are mounted.

11. The assembly of claim 9, wherein the one or more conductive contact elements are configured to extend away from a location at which the one or more conductive contact elements are coupled to the one of the space vehicles.

12. A method for mitigating electrostatic discharge between a first space vehicle and a second space vehicle, the method comprising:

installing an electrostatic discharge system on one or more of the first space vehicle or the second space vehicle for mitigating electrostatic discharge between the first space vehicle and the second space vehicle during a rendezvous of the first space vehicle with the second space vehicle, the electrostatic discharge mitigation system comprising one or more resistors and one or more compliant members electrically connected to the one or more resistors, the one or more compliant members comprising an electrically conductive material; and positioning the electrostatic discharge system on only one of the first space vehicle or the second space vehicle proximate a capture mechanism, the capture mechanism to at least temporarily join the first space vehicle and the second space vehicle, the one or more compliant members being separate from and positioned about the capture mechanism to initiate first physical contact between the first space vehicle and the second space vehicle.

13. The method of claim 12, further comprising configuring the electrostatic discharge mitigation system to reduce an electrostatic discharge current between the first space vehicle and the second space vehicle to less than or equal to substantially 800 milliamps over a time period of less than or equal to substantially 90 nanoseconds.

14. The method of claim 12, further comprising electrically isolating the one or more compliant members from the capture mechanism.

15. The method of claim 12, further comprising positioning the one or more compliant members on one or more insulated posts to electrically isolate the one or more compliant members from the capture mechanism.

16. The method of claim 12, further comprising enabling the one or more compliant members to rotate with a torsional spring.

17. The method of claim 12, further comprising positioning the one or more compliant members to provide initial physical contact between the first space vehicle and the second space vehicle when the first space vehicle and the second space vehicle are joining.

18. The method of claim 17, further comprising positioning the one or more compliant members to deform upon the initial physical contact.

19. The method of claim 12, further comprising situating another electrostatic discharge system on one of the first space vehicle and the second space vehicle to further mitigate the electrostatic discharge.

20. The method of claim 19, further comprising configuring the another electrostatic discharge system to reduce an electric potential between the first space vehicle and the second space vehicle by engulfing one or both of the first space vehicle and the second space vehicle with a plasma field generated by an electric propulsion apparatus of the one or both of the first space vehicle and the second space vehicle.

* * * * *